United States Patent
Min et al.

(10) Patent No.: US 10,331,241 B2
(45) Date of Patent: Jun. 25, 2019

(54) VEHICLE AND A METHOD FOR CONTROLLING SAME

(71) Applicants: HYUNDAI MOTOR COMPANY, Seoul (KR); KIA MOTORS CORPORATION, Seoul (KR)

(72) Inventors: Jungsang Min, Seoul (KR); Jongmin Oh, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/722,468

(22) Filed: Oct. 2, 2017

(65) Prior Publication Data

US 2018/0178597 A1 Jun. 28, 2018

(30) Foreign Application Priority Data

Dec. 23, 2016 (KR) .................. 10-2016-0177752

(51) Int. Cl.
```
G06F 3/038       (2013.01)
G06F 3/0338      (2013.01)
G06F 3/0481      (2013.01)
G06F 3/0354      (2013.01)
B60K 35/00       (2006.01)
```

(52) U.S. Cl.
CPC .............. *G06F 3/038* (2013.01); *B60K 35/00* (2013.01); *G06F 3/0338* (2013.01); *G06F 3/03547* (2013.01); *G06F 3/0481* (2013.01); *G06F 3/04815* (2013.01); *G06F 2203/04105* (2013.01); *G06F 2203/04804* (2013.01)

(58) Field of Classification Search
CPC ....................................................... B60C 23/02
USPC ......................................................... 340/933
See application file for complete search history.

(56) References Cited

U.S. PATENT DOCUMENTS

| | | | | |
|---|---|---|---|---|
| 5,956,019 A * | 9/1999 | Bang | ................. | G06F 3/03547 345/157 |
| 6,509,890 B1 * | 1/2003 | May | .................... | G06F 3/0338 345/157 |
| 9,858,683 B2 * | 1/2018 | Liu | ...................... | H04N 13/128 |
| 2010/0115455 A1 * | 5/2010 | Kim | ................... | G06F 3/04815 715/781 |
| 2010/0220175 A1 * | 9/2010 | Claydon | ............ | H04N 9/8715 348/43 |
| 2011/0279452 A1 * | 11/2011 | Ibe | ..................... | G01C 21/3638 345/419 |
| 2012/0086659 A1 * | 4/2012 | Perlin | .................... | G06F 3/005 345/173 |

(Continued)

*Primary Examiner* — Santiago Garcia
(74) *Attorney, Agent, or Firm* — Lempia Summerfield Katz LLC

(57) ABSTRACT

A vehicle and method for controlling the vehicle changes the transparency of each of a plurality of objects overlapping one another at a point on a three-dimensional map image according to the intensity of detected pressure. The vehicle may include a storage configured to store map information; a display configured to display a three-dimensional map image from a point of view based on the map information; an input device including a pressure input device configured to detect intensity of pressure; and a controller configured to control the display to change transparency of the overlapping objects at the same point on the 3D map image according to the intensity of the detected pressure.

19 Claims, 16 Drawing Sheets

(56) References Cited

U.S. PATENT DOCUMENTS

| | | | |
|---|---|---|---|
| 2012/0317521 A1* | 12/2012 | Ludwig | G06F 3/04883 |
| | | | 715/863 |
| 2013/0314402 A1* | 11/2013 | Furumura | G03B 35/02 |
| | | | 345/419 |
| 2013/0321398 A1* | 12/2013 | Howard | G06T 19/00 |
| | | | 345/419 |
| 2013/0321466 A1* | 12/2013 | Kocienda | G01C 21/26 |
| | | | 345/635 |
| 2013/0326583 A1* | 12/2013 | Freihold | G06F 3/04815 |
| | | | 726/3 |
| 2014/0145933 A1* | 5/2014 | Chae | G06F 3/017 |
| | | | 345/156 |
| 2014/0152774 A1* | 6/2014 | Wakabayashi | G08G 1/168 |
| | | | 348/46 |
| 2014/0340322 A1* | 11/2014 | Hong | G06F 3/0416 |
| | | | 345/173 |
| 2015/0051827 A1* | 2/2015 | Persson | G01C 21/30 |
| | | | 701/446 |
| 2015/0161819 A1* | 6/2015 | Chen | G06T 17/05 |
| | | | 345/426 |
| 2016/0109256 A1* | 4/2016 | Kumon | G01C 21/3664 |
| | | | 701/532 |
| 2016/0202761 A1* | 7/2016 | Bostick | G06F 3/016 |
| | | | 345/174 |
| 2016/0274717 A1* | 9/2016 | Wako | G06F 3/0488 |
| 2017/0010675 A1* | 1/2017 | Lee | G06F 3/017 |
| 2017/0131821 A1* | 5/2017 | Perlin | G06F 3/0414 |
| 2018/0108180 A1* | 4/2018 | Fei | H04N 5/2258 |

* cited by examiner

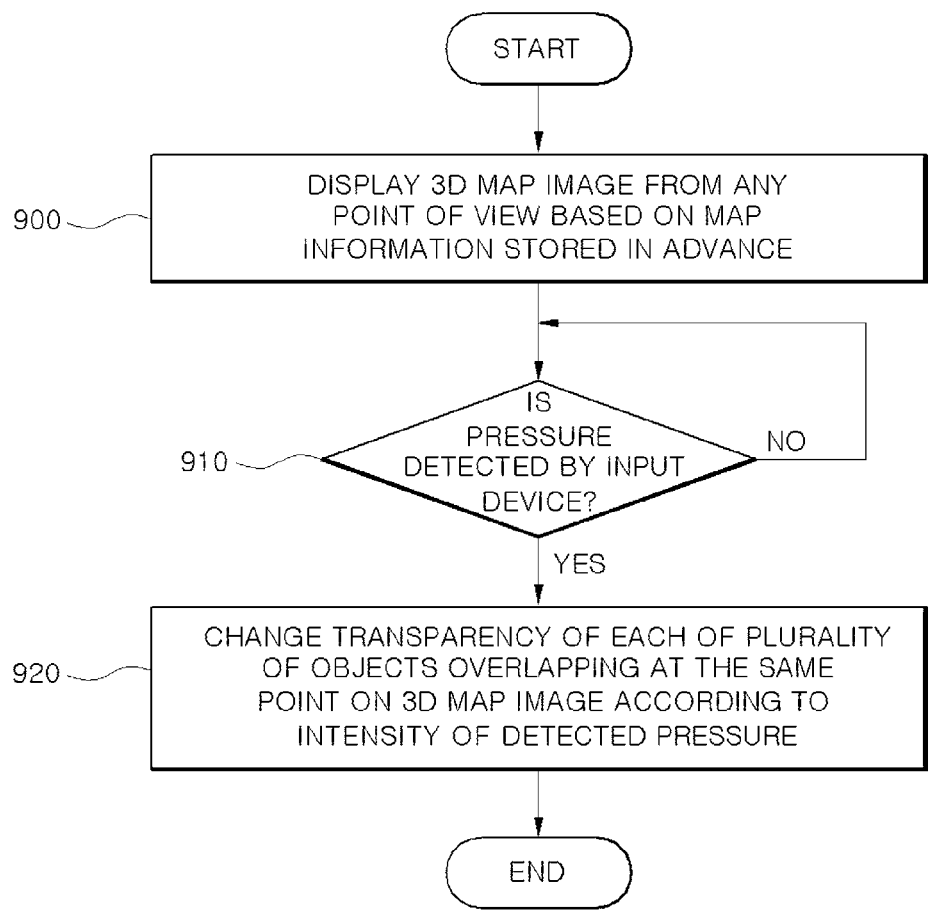

VEHICLE AND A METHOD FOR CONTROLLING SAME

CROSS-REFERENCE TO RELATED APPLICATION

This application claims priority to and the benefit of Korean Patent Application No. 10-2016-0177752, filed on Dec. 23, 2016, the disclosure of which is incorporated herein by reference in its entirety.

BACKGROUND

1. Field of the Disclosure

The present disclosure relates to a vehicle with an input device for detecting pressure and to a method for controlling the vehicle.

2. Discussion of Related Art

With the advance of technology, vehicles tend to provide various functions for the convenience of people in the vehicle, apart from the basic driving function.

As the functions provided by the vehicle vary, a burden for the driver to manipulate the functions in the vehicle may increase. The increased burden of manipulation may be a factor to distract and disturb the driver from safe driving. As the number of the functions increases, difficulty of manipulation may increase, such that inexperienced drivers of the vehicle might not properly manipulate and take advantage of the functions provided by the vehicle.

To solve this problem, studies on input devices for vehicles to reduce the burden and difficulty of manipulation for the driver are being conducted. As typical examples of input devices for vehicles, there are touch input devices for detecting touches of the driver and pressure input devices for detecting pressure applied by the driver. The driver may easily control the vehicle by touching the touch input device or pressing the pressure input device without the need for complicated manipulation.

SUMMARY

Embodiments of the present disclosure provide a vehicle and a method for controlling the vehicle to change the transparency of each of a plurality of objects overlapping one another at the same point on a three-dimensional map image according to the intensity of a detected pressure.

In accordance with one aspect of the present disclosure, a vehicle includes a storage configured to store map information; a display configured to display a three-dimensional (3D) map image from a point of view based on the map information; an input device including a pressure input device configured to detect an intensity of a pressure; and a controller configured to control the display to change a transparency of each of a plurality of overlapping objects, which overlap one another at a same point on the 3D map image according to the intensity of the detected pressure.

The controller may be configured to control the display, corresponding to the intensity of the detected pressure, to increase the transparency of an object among the plurality of overlapping objects, which is present within a range from the point of view.

The controller may be configured to control the display, corresponding to the intensity of the detected pressure and according to a distance from the point of view, to increase the transparency of an object among the plurality of overlapping objects, which is present within the range.

The controller may be configured to control the display, corresponding to the intensity of the detected pressure, to increase the transparency of at least one object among the plurality of overlapping objects.

The controller may be configured to determine priorities of the plurality of overlapping objects based on an order of the plurality of overlapping objects being closer to the point of view, and may be configured to control the display to increase the transparency of a number of objects corresponding to the intensity of the detected pressure based on the priorities.

The input device may comprise a touch input device configured to detect a touched point.

The controller may be configured to control the display to change the transparency of the plurality of overlapping objects at a point corresponding to the touched point on the 3D map image and according to the intensity of the detected pressure.

The pressure input device may be configured to detect a direction of the pressure.

The controller may be configured to control the display to move the point of view to a direction corresponding to the detected direction of the pressure.

The controller may be configured to control the display to move the point of view at a speed corresponding to the intensity of the detected pressure.

In accordance with another aspect of the present disclosure, a method for controlling a vehicle includes displaying a three-dimensional (3-D) map image from a point of view based on map information stored in advance; detecting a pressure through an input device; and changing a transparency of each of a plurality of overlapping objects, which overlap one another at a same point on the 3D map image according to the intensity of the detected pressure.

The changing transparency may comprise increasing the transparency, corresponding to the intensity of the detected pressure, of an object among the plurality of overlapping objects, which is present within a range from the point of view.

The changing transparency may comprise increasing the transparency, corresponding to the intensity of the detected pressure and according to a distance from the point of view, of an object among the plurality of overlapping objects, which is present within the range.

The changing transparency may comprise increasing the transparency of at least one object among the plurality of overlapping objects corresponding to the intensity of the detected pressure.

The changing transparency may comprise determining priorities of the plurality of overlapping objects based on an order of the plurality of overlapping objects being closer to the point of view, and increasing the transparency of a number of objects corresponding to the intensity of the detected pressure based on the priorities.

The method may further comprise detecting a touch through an input device.

The changing transparency may comprise changing the transparency, according to the intensity of the detected pressure, of the plurality of overlapping objects at a point corresponding to the touched point on the 3D map image.

The method may further comprise moving the point of view to a direction corresponding to the detected direction of the pressure.

The moving the point of view may comprise moving the point of view at a speed corresponding to the intensity of the detected pressure.

BRIEF DESCRIPTION OF THE DRAWINGS

The above and other objects, features and advantages of the present disclosure will become more apparent to those of ordinary skill in the art by describing in detail embodiments thereof with reference to the accompanying drawings, in which:

FIG. 10 shows a flowchart illustrating a method for controlling a vehicle, according to an embodiment of the present disclosure.

The following symbols are utilized throughout the drawings and referred to throughout the detailed description:
1: VEHICLE
34: DISPLAY
100, 200: TOUCH INPUT DEVICE
300: CONTROLLER
400: STORAGE
500: INPUT DEVICE
600: PRESSURE INPUT DEVICE

DETAILED DESCRIPTION OF EMBODIMENTS

Embodiments of a vehicle and method for controlling the same will now be described in detail with reference to accompanying drawings.

Figure 1:
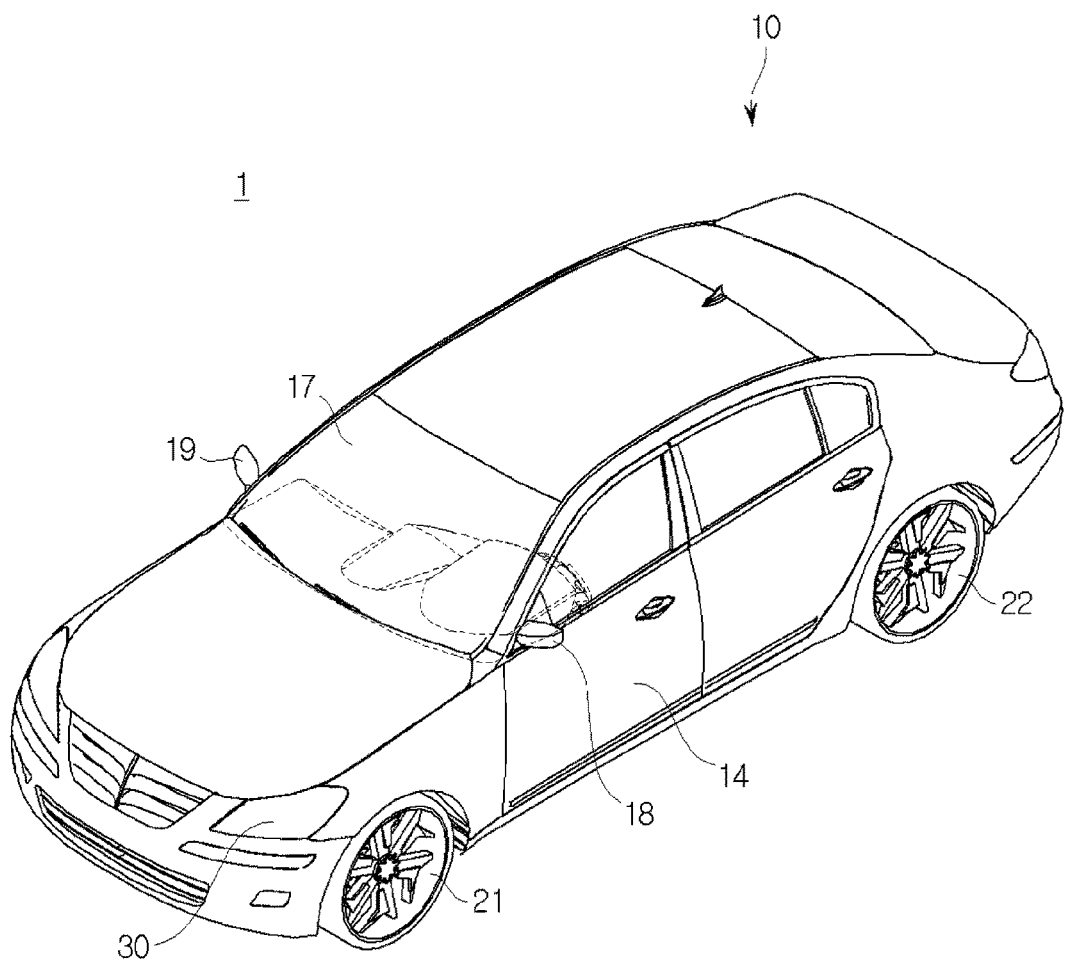
FIG. 1 shows the exterior of a vehicle, according to an embodiment of the present disclosure.

FIG. 1 shows the exterior of a vehicle, according to an embodiment of the present disclosure.

Referring to FIG. 1, a vehicle 1 in an embodiment includes a main body 10 forming the exterior of the vehicle 1, wheels 21 and 22 for moving the vehicle 1, doors 14 for shielding the interior of the vehicle 1 from the outside, a front window 17 through which the driver can see a view in front of the vehicle 1, and side mirrors 18, 19 for helping the driver see areas behind and to the sides of the vehicle 1.

The wheels 21 and 22 include front wheels 21 equipped on the front side or end of the vehicle 1 and rear wheels 22 equipped on the rear side or end of the vehicle 1. The front wheels 21 or rear wheels 22 may move the main body 10 forward or backward with turning or rotation force provided from a driving unit 700, which is described later.

The doors 14 are attached onto the left and right sides of the main body 10. The doors 14 open for the driver to enter and exit the vehicle 1 and close for shielding the interior of the vehicle 1 from the outside.

The front glass 17, also termed as a windshield glass, is placed on the top front of the main body 10 for permitting the driver inside the vehicle 1 to see the view in front of the vehicle.

The side mirrors 18 and 19 include a left side mirror 18 and a right side mirror 19 placed on the left and right sides of the main body 10, respectively, for helping the driver obtain views behind and to the sides of the vehicle 1.

Figure 2:
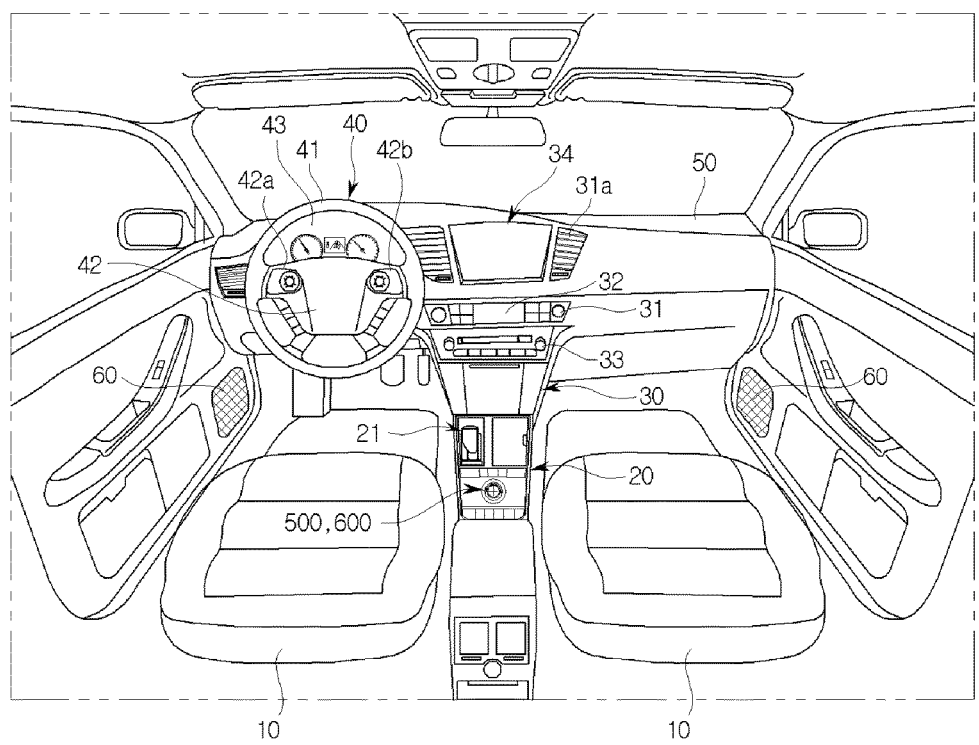
FIG. 2 shows internal features of a vehicle, according to an embodiment of the present disclosure.

FIG. 2 shows internal features of a vehicle, according to an embodiment of the present disclosure.

Referring to FIG. 2, the vehicle 1 may include seats 10 reserved for a driver and passengers to sit on and a dashboard 50 having a a center fascia 30 and a steering wheel 40. The vehicle may also include a gear box 20 below the center facia 30.

The gear box 20 may include a gearshift 21 for shifting gears of the vehicle 1. A dial controller for controlling functions of the vehicle 1 may also be installed.

The steering wheel 40 disposed on the dashboard 50 is a tool to control a traveling direction of the vehicle 1. The steering wheel 40 may include a rim 41 to be held by the driver and a spoke 42 connected to a steering system of the vehicle 1 for connecting the rim 41 to a hub of a rotation shaft for steering. In an embodiment, control devices 42a, 42b may be formed on the spoke 42 to control various devices, e.g., the audio system, in the vehicle 1.

A cluster 43 may have a speed gauge to indicate a speed of the vehicle and an rpm gauge to indicate the engine or motor rpm of the vehicle. The driver may check the information relating to the vehicle at a glance. The cluster 43 may also indicate information about the vehicle 1, such as about traveling information of the vehicle 1. For example, the cluster 43 may indicate a distance to empty (DTE) based on the remaining amount of fuel, navigation information, audio information, and/or the like.

In order for the driver to check the vehicle-related information without excessively turning his/her eyes away from the forward direction while driving, the cluster 43 may be equipped in an area of the dashboard 50 to face the steering wheel 40.

Although not shown, a Head Up Display (HUD) for displaying visual information for the driver may also be equipped on the dashboard 50.

In the center fascia 30 arranged on the dashboard 50, an air conditioner 31, a clock 32, an audio system 33, a display 34, and the like may be installed.

The air conditioner 31 keeps the atmosphere inside the vehicle 1 pleasant by controlling temperature, humidity, air cleanliness, and air flow inside the vehicle 1. The air conditioner 31 may include at least one vent 31a installed in the center fascia 30 for venting air. There may also be buttons or dials installed in the center fascia 30 to control the air conditioner 31 and the like. A person in the vehicle 1, e.g., the driver, may control the air conditioner 31 with the buttons arranged on the center fascia 30.

The clock 32 may be arranged around the buttons or dials for controlling the air conditioner 31.

The audio system 33 may include a control panel on which a number of buttons are arranged to perform functions of the audio system 33. The audio system 33 may provide a radio mode for radio listening and a media mode for reproducing audio files stored in various storage media.

The audio system 33 may output an audio file into sound through the speaker 60. Although FIG. 2 shows that the speaker 60 is arranged on the inner side of a door, where to arrange the speaker 60 is not limited thereto.

The display 34 may display various information relating directly or indirectly to the vehicle 1. For example, the display 34 may display direct information, such as information about a state of the vehicle 1, and indirect information, such as multimedia information including pictures or moving images provided from inside/outside of the vehicle 1.

The display 34 may also display navigation information, such as a map image. This is described in more detail below.

The display 34 may be implemented with Liquid Crystal Displays (LCDs), Light Emitting Diodes (LEDs), Plasma Display Panels (PDPs), Organic Light Emitting Diodes (OLEDs), Cathode Ray Tubes (CRTs), etc., without being limited thereto.

The dashboard 50 may further include an input device 500 (see FIG. 3) for detecting a touch and/or pressure of the driver to generate a control command. In the case when a map image is displayed on the display 34, the driver may control the map image through the input device 500.

A vehicle configured for the driver to easily control the displayed map image while driving the vehicle is now described in detail.

Figure 3:
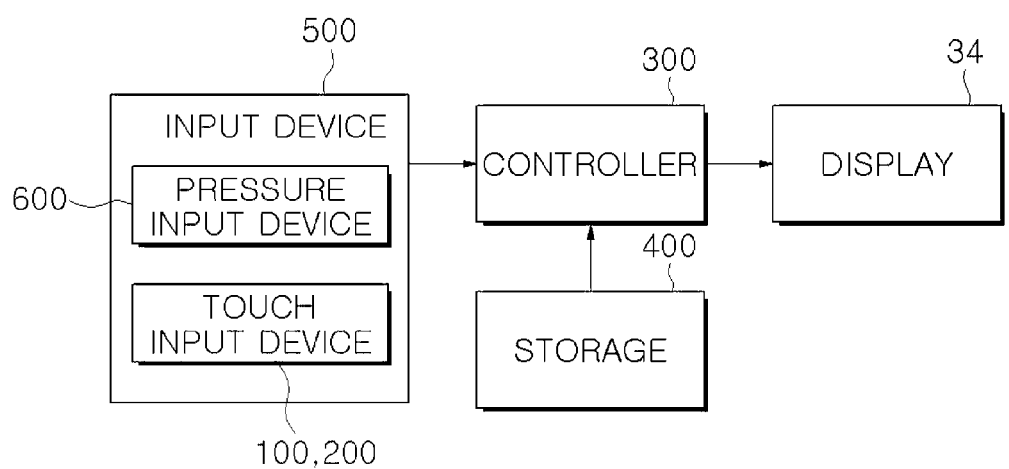
FIG. 3 is a control block diagram of a vehicle, according to an embodiment of the present disclosure.

FIG. 3 is a control block diagram of a vehicle, according to an embodiment of the present disclosure.

In an embodiment, the vehicle 1 may include a storage 400 for storing various information including map information in advance, a display 34 for displaying a map image from a point of view based on the map information, an input device 500 for detecting pressure and touch, and a controller 300 for controlling the displayed map image in response to the detected pressure and touch.

The input device 500 may detect the touch and pressure of an occupant, including the driver, as a control command for the vehicle 1. For this, the input device 500 may include a touch input device 100, 200 (see also FIG. 2) for detecting a touch of an occupant, and a pressure input device 600 for detecting pressure of the occupant.

The touch input device 100, 200 may detect a touch of an occupant, such as or including the driver. The touch input device 100, 200 may be implemented in various ways within the technical concept to detect touches. For example, the touch input device 100, 200 may be implemented separately in the vehicle 1, or may be implemented by being integrated with at least one component in the vehicle 1. In the latter case, the touch input device 100, 200 may be integrated with the display 34 into a touch screen, as will be described below.

The touch input device 100, 200 arranged separately in the vehicle 1 may be arranged in various forms, e.g., a form of a plate, circle, or ellipse capable of detecting touches.

In an embodiment, the touch input device 100, 200 may be formed to have an inwardly sunken area to detect touches.

Figure 4A:
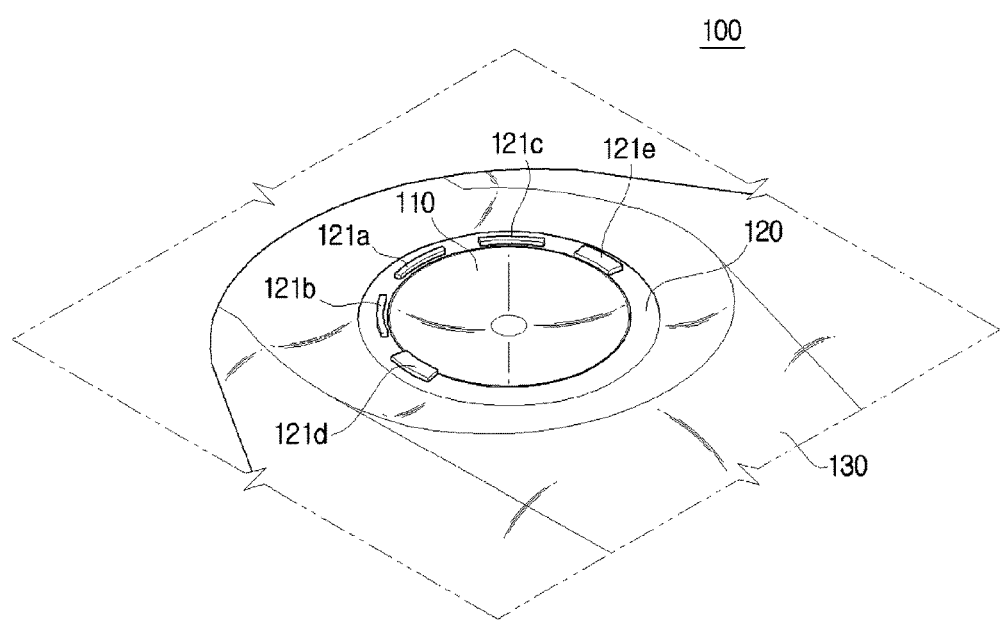
FIGS. 4A-4C show a touch input device, according to an embodiment of the present disclosure.
Figure 4B:
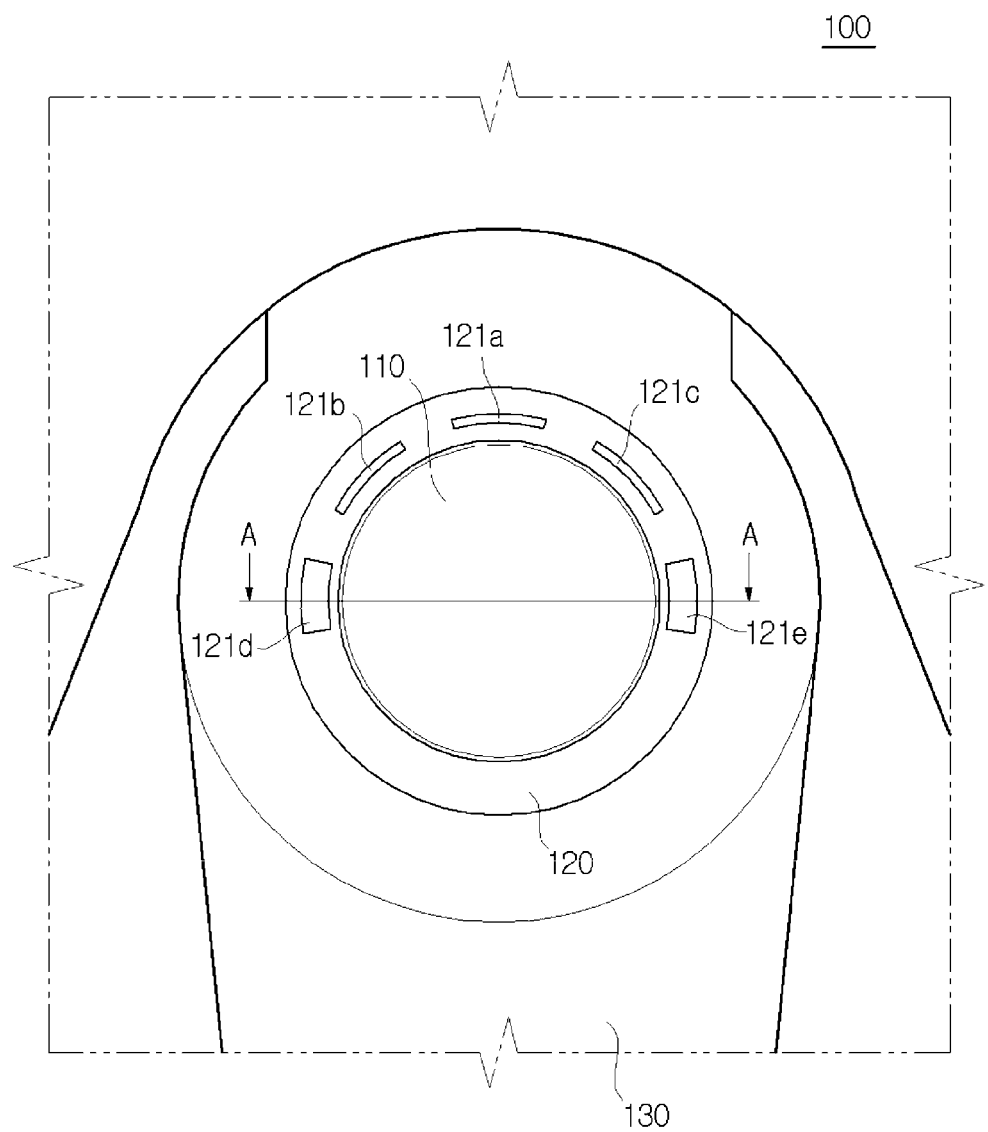
Figure 4C:
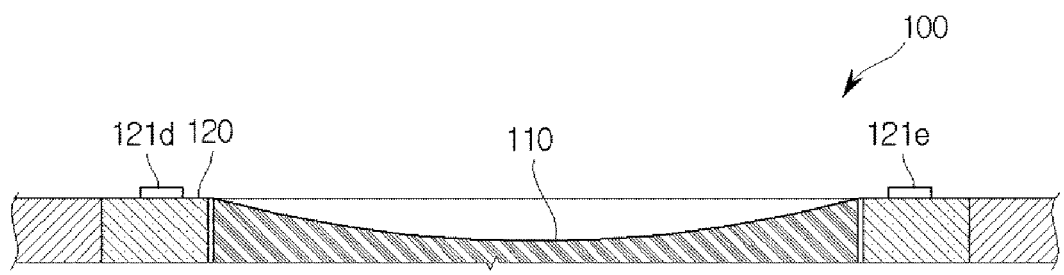
Figure 5A:
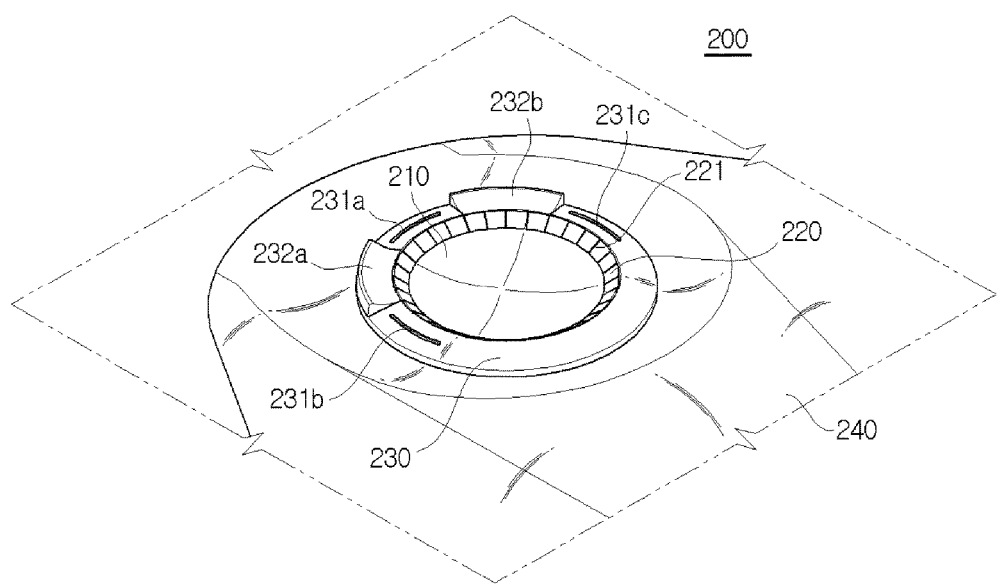
FIGS. 5A-5C show a touch input device, according to another embodiment of the present disclosure.
Figure 5B:
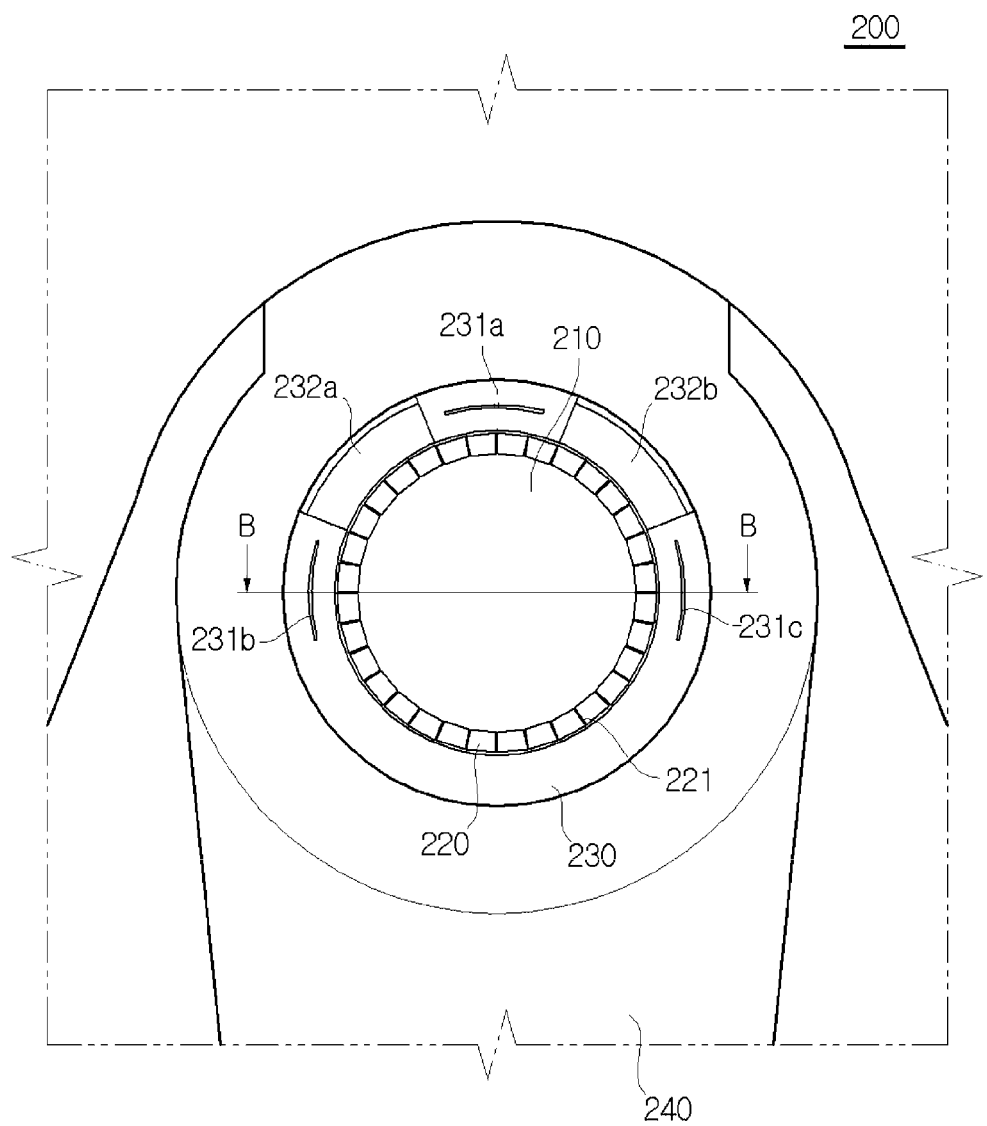
Figure 5C:
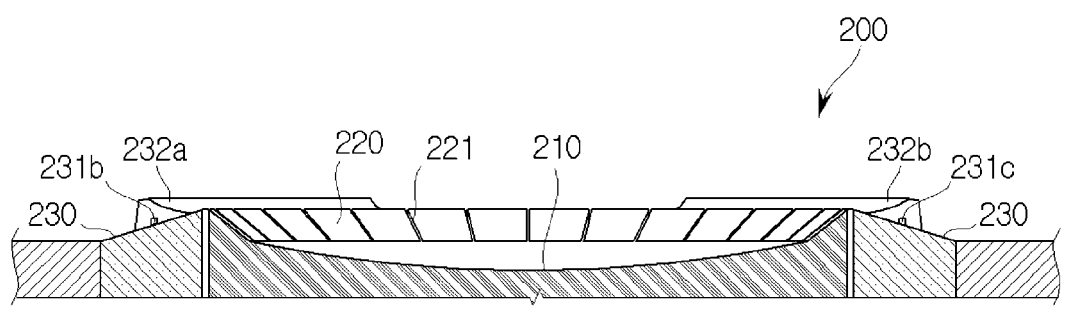

FIGS. 4A-4C show a touch input device 100, according to an embodiment of the present disclosure, and FIGS. 5A-5C show a touch input device 200, according to another embodiment of the present disclosure.

FIG. 4A is a perspective view of a touch input device 100, according to an embodiment of the present disclosure. FIG. 4B is a plan view of the touch input device 100, according to an embodiment of the present disclosure. FIG. 4C is a cross-sectional view of the touch input device 100 cut along a line of A-A in FIG. 4B, according to an embodiment of the present disclosure.

A touch input device 100 shown in FIGS. 4A-4C may include a touch part 110 for detecting a touch of the occupant and may include a border part 120 enclosing around the touch part 110.

The touch part 110 may be a touch pad to generate a signal when the occupant contacts or approaches it with a pointer, such as his/her finger or a touch pen. The occupant may input a desired control command by inputting a predetermined touch gesture to the touch part 110.

The touch pad may include a touch film or touch sheet with a touch sensor. The touch pad may also include a touch panel, a display device with a touchable screen.

Recognizing the pointer's position while the pointer is not contacting but approaching the touch pad is called 'proximity touch', and recognizing the pointer's position when the pointer contacts the touch pad is called 'contact touch'. Proximity touch is made by recognizing a position on the touch pad vertically corresponding to a position in the air where the pointer approaches the touch pad.

The touch pad may various well-known types of touch pads or touch surfaces and methods. For example, the touch pad may use resistive methods, optical methods, capacitive methods, ultrasonic methods, or pressure methods.

The border part 120 may refer to a part that encloses around or surrounds the touch part 110, and may be formed of a separate member from that of the touch part 110. There may be key buttons or touch buttons, such as buttons 121a-121e as depicted in FIG. 4A, arranged on the border part 120 to surround the touch part 110. The occupant may input a control command by a touch through the touch part 110, or by using the buttons 121a-121e arranged on the border part 120 around the touch part 110.

In this embodiment of the present disclosure, the touch input device 100 may further include a wrist support 130 for supporting the wrist of the occupant. The wrist support 130 may be located higher up than the touch part 110. Thus, when the occupant is intending to touch the touch part 110 with his/her finger while putting his/her wrist on the wrist supporter 130, the wrist support 130 protects the wrist from bending. Accordingly, it may prevent possible musculoskeletal disorders and provide more comfort for manipulations by the occupant.

The touch part 110 may include a lower part that is lower than the level of a boundary with the border part 120. Specifically, the touch surface of the touch part 110 may be located lower than the boundary between the touch part 110 and the border part 120. For example, the touch surface may be inclined downward from the boundary with the border part 120 or may be located a step away from the boundary of the border part 120. For example, the touch part 110, in accordance with an embodiment of the present disclosure as shown in FIG. 4C, includes a curved part including a concave curved area.

With the touch part 110 including the lower part than the level of the boundary with the border part 120, the occupant may perceive the area and boundary of the touch part 110 through a tactile sense. Higher touch recognition rate may be obtained in the center part of the touch part 110 of the touch input device 100. Since the occupant may intuitively perceive the touch area and boundary through a tactile sense while trying to input a touch, the occupant may input the touch with improved touch input accuracy.

The touch part 110 may include a concave area. The concave form is a form of a dent or a sunken form, including the form that comes inside not only roundly but also slantingly or stepwise.

Referring to FIG. 4C, the touch part 110 may include a concave curved area. The curve of the touch part 110 may have different curvatures. For example, the touch part 110 may be formed such that a curvature of the center part is small (which means the curvature radius is large), and a curvature near the outer side is large (which means the curvature radius is small).

With the curved surface included in the touch part 110, the occupant may have a better feeling or sense of touch (or feeling of manipulation) while making touches. The curved area of the touch part 110 may be formed to be similar to the trajectories input using movements of a person's fingertip when he/she is moving their fingertip, such as moving the finger while the wrist is fixed, or such as while turning or twisting the wrist while stretching the finger.

The touch part 110 may be implemented in a round form. In such an embodiment, it may be easy to form the concave curved area. Moreover, being implemented in a round form, the touch part 110 may allow the occupant to easily make rolling or spinning gestures because the occupant may sense the round touch area of the touch part 110 through a tactile sense.

Being implemented having a curved contour, the touch part 110 may allow the occupant to be able to know intuitively where his/her finger is making contact on the touch part 110. The curved touch part 110 may have a different inclination at every point. Accordingly, the occupant may know intuitively of where his/her finger is on the touch part 110 through a sense of the inclination felt by his/her finger. This feature may help the occupant input a desired gesture. This feature may also improve input accuracy of the gesture by providing feedback about where his/her finger is on the touch part 110 while the occupant is inputting the gesture to the touch part 110 with his/her eyes fixed somewhere other than the touch part 110.

Contrary to what is described above, a touch input device 200 in accordance with the embodiment of FIGS. 5A-5C may have a concave area divided into a center and an outer part.

FIG. 5A is a perspective view of a touch input device 200, according to another embodiment of the present disclosure. FIG. 5B is a plan view of the touch input device 200, according to another embodiment of the present disclosure. FIG. 5C is a cross-sectional view of the touch input device 200 cut along a line of B-B in FIG. B, according to another embodiment of the present disclosure.

A touch input device 200 as shown in FIGS. 5A-5C may include a touch part 210, 220 for detecting a touch of an occupant, including the driver, and may include a border part 230 enclosing around the touch part 210, 220.

The touch part 210, 220 detects touches in the same manner as in the embodiment of FIGS. 4A-4C.

The border part 230 may refer to an area that encloses around or surrounds the touch part 210, 220, and may be formed of a separate member from that of the touch part 210, 220. There may be key buttons 232a, 232b or touch buttons 231a, 231b, 231c arranged on the border part 230 to surround the touch part 210, 220. The occupant may make a gesture on the touch part 210, 220, or may input a signal using the buttons 231, 232 arranged on the border part 230 around the touch part 210, 220.

Furthermore, like FIGS. 4A-4C, the touch input device 200 may include a wrist support 240 located for supporting a wrist of the occupant.

Referring to FIG. 5C, the touch part 210, 220 may include a lower part that is than the level of a boundary with the border part 230. Specifically, the touch surface of the touch part 210, 220 may be located lower than the boundary between the touch part 210, 220 and the border part 230. For example, the touch surface may be inclined downward from the boundary with the border part 230 or may be located a step away from the boundary of the border part 230. As shown in FIG. 5C, the touch part 210, 220 may include a gesture input unit 210 having a concave curved form.

As shown in FIGS. 5A-5C, the touch part 210, 220 may include a concave area.

In an embodiment, the touch part 210, 220 may include a swiping input unit 220 located along the circumference of the gesture input unit 210 and to be slanted downward. If the touch part 210, 220 has a round form, the gesture input unit 210 may be in the form of a part of a spherical surface, and the swiping input unit 220 may be formed to surround the circumference of the curved gesture input unit 210.

The swiping input unit 220 may detect swiping gestures. For example, the occupant may input a swiping gesture along the swiping input unit 220 having the round form. The occupant may input a swiping gesture clockwise or counterclockwise along the swiping input unit 220.

The swiping input unit 220 may include a plurality of division lines 221. The division lines 221 may provide visual or tactile information about a relative position for the occupant. For example, the division lines 221 may be engraved or embossed. The division lines 221 may be arranged at uniform intervals. Accordingly, the occupant may intuitively know of the number of division lines 221 that his/her finger has passed while in a swiping motion, and thus elaborately adjust the length of the swiping gesture.

In an embodiment, a cursor to be displayed on the display 34 may be moved according to the number of the division lines 221 that the finger has passed in the swiping gesture. If various selected letters are consecutively displayed on the display 34, selection of a letter may be moved over to the next letter each time a single division line 221 is passed in the swiping motion of the occupant.

In the embodiment of the present disclosure as shown in FIGS. 5A-5C, an inclination of the swiping input unit 220 may be greater than a tangential inclination of the gesture input unit 210 on the border between the swiping input unit 220 and the gesture input unit 210. With an inclination of the swiping input unit 220 steeper than that of the gesture input unit 210 while the occupant is making a gesture on the gesture input unit 210, the occupant may intuitively perceive the gesture input unit 210. Further, recognition of a touch on the swiping input unit 220 may be disabled while a gesture is being input to the gesture input unit 210. Accordingly, even if the occupant reaches the boundary with the swiping input unit 220 while inputting a gesture to the gesture input unit 210, the gesture input to the gesture input unit 210 and a swiping gesture input to the swiping input unit 220 may not overlap.

The gesture input unit 210 and the swiping input unit 220 may be integrally formed as the touch part 210, 220. Touch sensors may be arranged separately for the gesture input unit 210 and the swiping input unit 220 or a single touch sensor may be arranged for both of them. If there is a single touch sensor for the gesture input unit 210 and the swiping input unit 220, the controller 300 may distinguish a touch signal to the gesture input unit 210 from that to the swiping input unit 220 by dividing a touch area of the gesture input unit 210 and a touch area of the swiping input unit 220.

The touch input device 200 may further include a button input means 231, 232. The button input means 231, 232 may be located around the touch part 210, 220. The button input means 231, 232 may include touch buttons 231a, 231b, 231c for performing designated functions when touched by the occupant, or pressure buttons 232a, 232b for performing designated functions while changing their positions by force applied by the occupant.

The pressure input device 600 may be implemented in various forms to detect pressure applied by the occupant. For example, the pressure input device 600 may be arranged separately in the vehicle 1 for detecting the pressure, or alternatively, arranged to be incorporated with a component in the vehicle 1.

In the latter case, the pressure input device 600 may be implemented along with the aforementioned touch input devices 100, 200, such as the touch input device 200. In this case, the occupant may apply pressure to the input device 500 while making a touch on the input device 500.

Furthermore, it is also possible for the pressure input device 600 to be combined with the touch screen and implemented by combining the touch input device 200 with the display 34. As a result, the occupant may apply pressure while making a touch at a desired point on an image displayed on the display 34, i.e., the touch screen.

The pressure input device 600 may detect the pressure applied by the occupant in various well-known methods. In an embodiment, the pressure input device 600 may detect pressure using a top plate pressed directly by the occupant and a force sensor arranged on the bottom of the top plate. Furthermore, the pressure input device 600 combined with the touch screen may detect pressure applied by the occupant based on a change in distance between the cover glass of the touch screen and the back light. Still further, the pressure input device 600 may even detect the intensity of pressure based on the distance between the cover glass and the back light, as well as the presence of the pressure.

Once the pressure is detected, the pressure input device 600 may generate haptic or taptic engine-based vibration feedback.

Turning back to FIG. 3, the storage 400 may store various information relating directly or indirectly to the vehicle 1 in advance. For example, the storage 400 may store direct information, such as map information, navigation information of the vehicle 1, and information about a state of the vehicle 1. The storage 400 may also store indirect information, such as multimedia information including pictures or moving images provided from inside/outside of the vehicle 1 in advance.

The storage 400 may store map information in advance, which becomes a basis for a map image to be displayed on the display 34. More specifically, the storage 400 may store at least one of a usual map, including types of roads and number of lanes, and a detailed map. The detailed map may have high precision to control the vehicle 1 in a precise manner, and include information about a location on the plane, altitude, inclination, curvature, and the number of lanes of the road. The detailed map may further include information about road facilities, such as traffic signs and signals, and information about buildings around the road.

The map information may even include three-dimensional (3D) map information stored in the storage 400 to display a 3D map image on the display 34. For this, the 3D map information may include structural information of roads, objects on the road, and objects around the road. The object as herein used may refer to any structurally identifiable thing, including a building around the road, a road facility, and the like.

The display 34 may display a map image generated based on the map information stored in the storage 400. If the map information stored in the storage 400 includes 3D map information, the display 34 may display the 3D map image generated based on the 3D map information. Further, the display 34 may display a 3D map image from a point of view, which may be a current location of the vehicle 1, any point of view determined from the current location, or any point of view determined by a user input.

Figure 6:
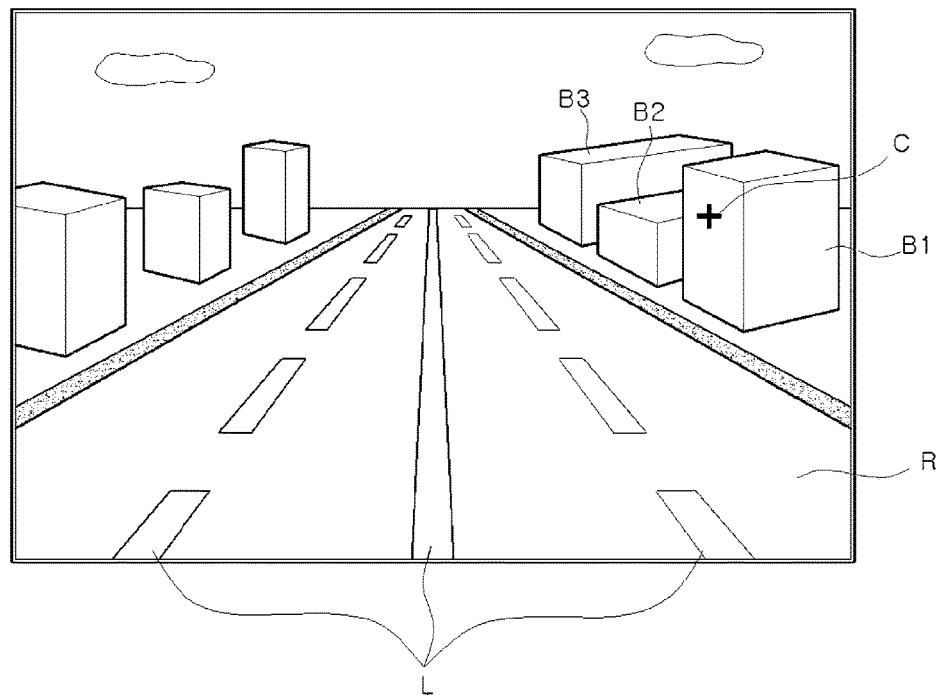
FIG. 6 shows a three-dimensional (3D) map image displayed by a display, according to an embodiment of the present disclosure.

FIG. 6 shows a 3D map image displayed by a display, according to an embodiment of the present disclosure. In FIG. 6, the 3D map image is shown from a point of view of the vehicle 1 looking ahead.

Referring to FIG. 6, the 3D map image may include a plurality of objects having 3D features. For example, on the 3D map image of FIG. 6, objects including a road R on which the vehicle is running, lanes L on the road, buildings B1, B2, B3, etc., around the road, and the like, may be displayed. The driver may easily recognize the spatial information around where he/she is currently driving or around a location of interest from the 3D map image.

The display 34 may also display a cursor C along with the 3D map image. The cursor C may be moved on the 3D map image, following the touched point detected by the touch input device 200 in one embodiment. The occupant may change a point of view by moving the cursor C, input a touch, apply pressure on a location of interest, or any combination thereof.

While the cursor C has the form of a cross in FIG. 6, the cursor C displayed on the display 34 may be implemented in the form of an arrow or any other form.

Meanwhile, a plurality of objects may sometimes overlap one another at the same point on a 3D map image. For example, in the case of the 3D map image of FIG. 6, the objects B1, B2, and B3 overlap one another such that an object nearer to the point of view may hide other objects farther from the point of view. Specifically, object B2 may be hidden by the object B1, which is nearer to the point of view, and object B3 may be hidden by the objects B1 and B2, which are nearer to the point of view.

This effect takes place where the display 34 displays a 3D map image on a two-dimensional (2D) plane and, as a result, information about some objects may not be represented properly on the 3D map image. If the driver sets an object to a destination, the driver may have difficulty in determining whether the object B2 or B3 hidden by the object B1 corresponds to the destination he/she sets.

To solve this problem, the vehicle 1 in accordance with an embodiment of the present disclosure may provide information about a hidden object through the display 34 by changing the transparency of each of the plurality of overlapping objects according to the intensity of pressure detected by the pressure input device 600. The term 'transparency' as herein used may refer to the extent to which a back object hidden behind a front object is displayed through the front object. For example, transparency 0 may mean that the back object is completely hidden by the front object, and transparency 10 may mean that the back object is fully displayed through the front object.

A method for changing the respective transparency of a plurality of overlapping objects by means of the controller 300 and the input device 500 will now be described in detail.

Referring to FIG. 3, the controller 300 may control the display 34 to change the transparency of each of a plurality of objects overlapping one another at the same point on the 3D map image, according to the intensity of a detected pressure.

If the pressure input device 600 is implemented by being integrated with the touch input device 200 of FIGS. 5A-5C, the controller 300 may control the display 34 to change the transparency of the plurality of objects overlapping one another at a point on the 3D map image corresponding to a detected touched point, according to the intensity of the detected pressure. As the cursor C moves on the 3D map image, following the touched point detected by the touch input device 200, the point corresponding to a detected touched point may refer to the position of the cursor C in FIG. 6.

In other words, the controller 300 may control the display 34 to control the transparency of each of the plurality of overlapping objects at the point where the cursor C is located on the 3D map image.

Figure 7:
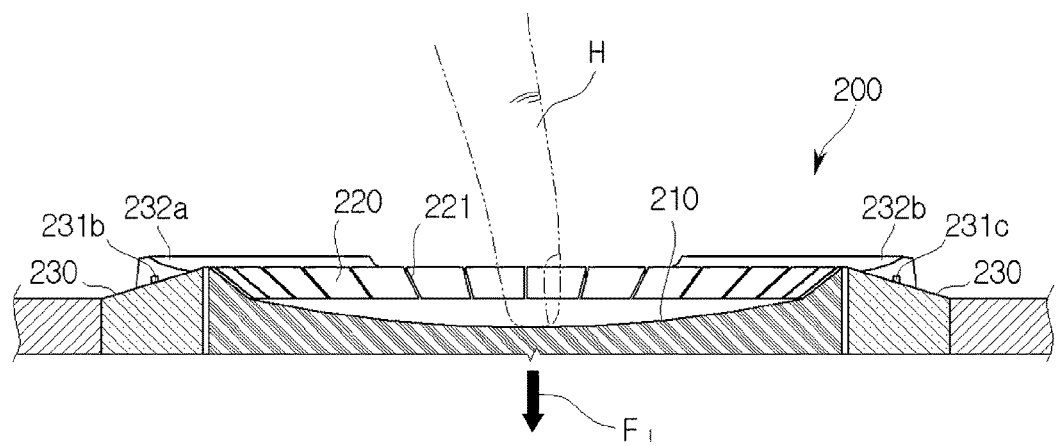
FIG. 7 shows an example of when a pressure is applied to a pressure input device combined with the touch input device of FIG. 5C.
Figure 8A:
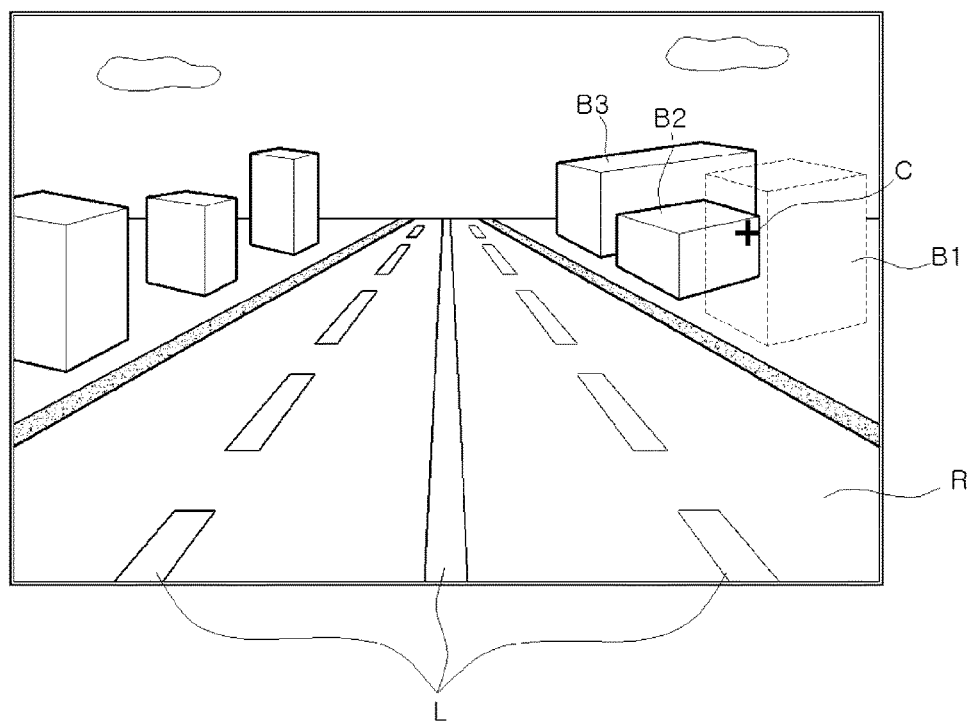
FIGS. 8A and 8B show examples of how to change the transparency of an object according to the pressure detected by an input device, according to various embodiments of the present disclosure.
Figure 8B:
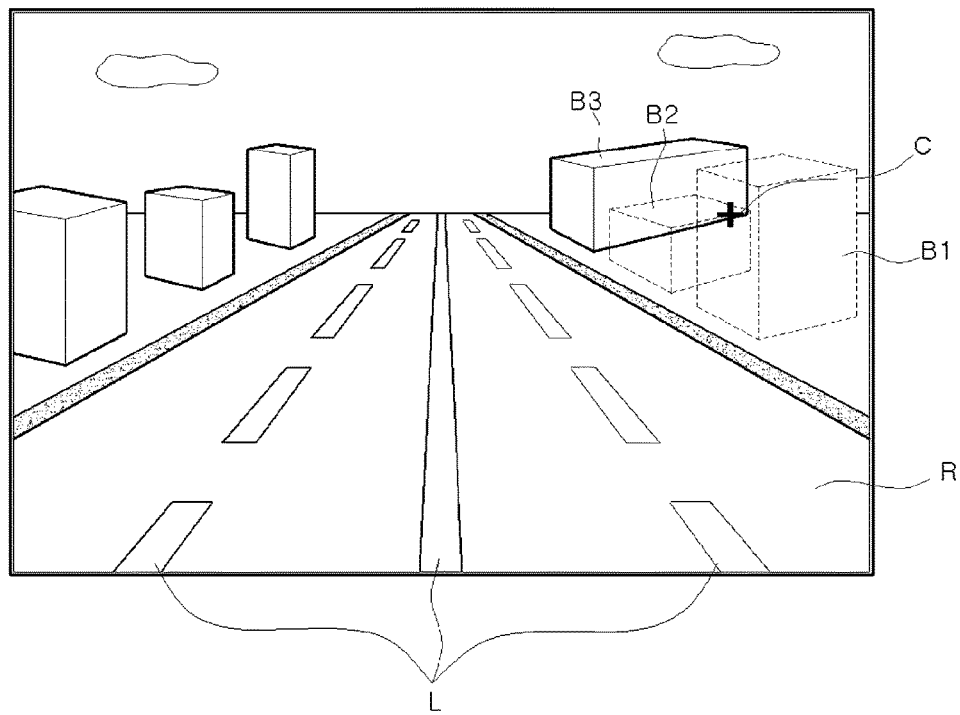

FIG. 7 shows an example where a pressure is being applied to a pressure input device combined with the touch input device of FIG. 5C. FIGS. 8A and 8B show an example of how to change the transparency of an object according to the pressure detected by an input device, according to various embodiments of the present disclosure. In FIGS. 8A and 8B, dotted lines may represent objects with increased transparency.

To change the transparency of a plurality of overlapping objects, the occupant may input a touch to the touch input device 200 to move the cursor C to a point where the objects overlap one another on a 3D map image. As a result, it may be seen that the cursor C is located on the object B1 as shown in FIG. 6.

Next, the occupant may apply pressure to the pressure input device 600 to control the transparency of overlapping objects. Referring to FIG. 7, the pressure input device 600 may detect the presence and intensity of a pressure F1 applied from the outside.

The controller 300 may control the transparency of each of the objects B1, B2, and B3 overlapping at a point of the cursor C, according to the intensity of the detected pressure F1. The controller 300 may control the transparency of the objects B1, B2, and B3 in various methods based on the intensity of the pressure F1.

In an embodiment, the controller 300 may increase the transparency of an object present within a range corresponding to the intensity of the pressure F1 from a point of view. Specifically, the controller 300 may expand the range from the point of view as the intensity of the pressure F1 increases.

If only the object B1 is present within the range corresponding to the intensity of the detected pressure F1, the controller 300 may control the display 34 to increase the transparency of the object B1. As a result, the display 34 may display structural information including a feature of the object B2 that was hidden on the 3D map image, as shown in FIG. 8A.

Furthermore, as the occupant increases the intensity of pressure F1, the objects B1 and B2 may be present within a range corresponding to the increased intensity of the pressure F1. As a result, the controller 300 may control the display 34 to increase the transparency of the objects B1 and B2, whereby the display 34 may display structural information including a feature of the object B3 that was hidden on the 3D map image, as shown in FIG. 8B.

In another embodiment, the controller 300 may control the display 34 to increase the transparency of at least one of a plurality of overlapping objects, which corresponds to the intensity of the detected pressure. Specifically, the controller 300 may determine priorities of the overlapping objects based on the order of being closer to a point of view, and control the display 34 to increase the transparency of a number of objects corresponding to the intensity of the detected pressure based on the priorities.

In the case of FIG. 6, the controller 300 may determine priorities of objects for which the transparency would be increased, based on distances from a point of view. As a result, the controller 300 may determine the priorities in the order of the objects B1, B2, B3.

If there is one object corresponding to the intensity of the detected pressure F1, the controller 300 may control the display 34 to increase the transparency of the object B1. As a result, the display 34 may display structural information including the feature of the object B2 that was hidden on the 3D map image, as shown in FIG. 8A.

Furthermore, as the occupant increases the intensity of pressure F1, there may be two objects corresponding to the increased intensity of the pressure F1. As a result, the controller 300 may control the display 34 to increase the transparency of the two objects B1 and B2 according to the priorities, and the display 34 may display structural information including the feature of the object B3 that was hidden on the 3D map image, as shown in FIG. 8B.

Accordingly, the occupant may easily check the features of the respective overlapping objects.

A method for controlling the transparency of a plurality of objects overlapping at a point on a 3D map image corresponding to a touched point, i.e., a point of the cursor C, was described above. Contrary to what was described above, it is also possible to control the transparency of all objects overlapping at the same point on a 3D map image. The aforementioned method may be equally applied in this case, except that it is applied to all the overlapping objects present on the 3D map image.

For example, the controller 300 may increase the transparency of overlapping objects present within a range from a point of view corresponding to the intensity of the detected pressure, or increase the transparency according to priorities, i.e., an order of priority, of a number of overlapping objects corresponding to the intensity of the detected pressure.

Furthermore, the controller 300 may control the display 34 to move the point of view to a direction corresponding to a direction of the detected pressure. For this feature, the pressure input device 600 may detect the direction of the pressure.

Figure 9A:
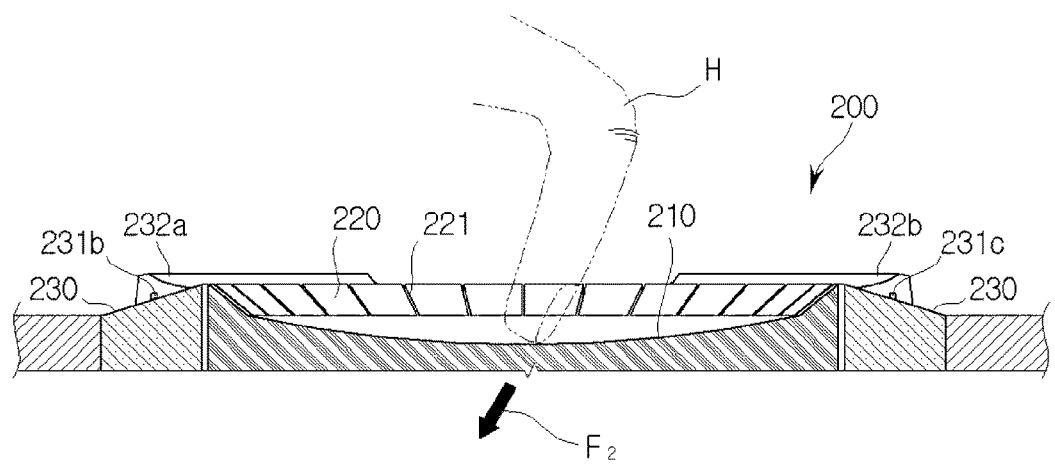
FIGS. 9A and 9B show examples of how a pressure input device detects the pressure from different directions, according to an embodiment of the present disclosure.
Figure 9B:
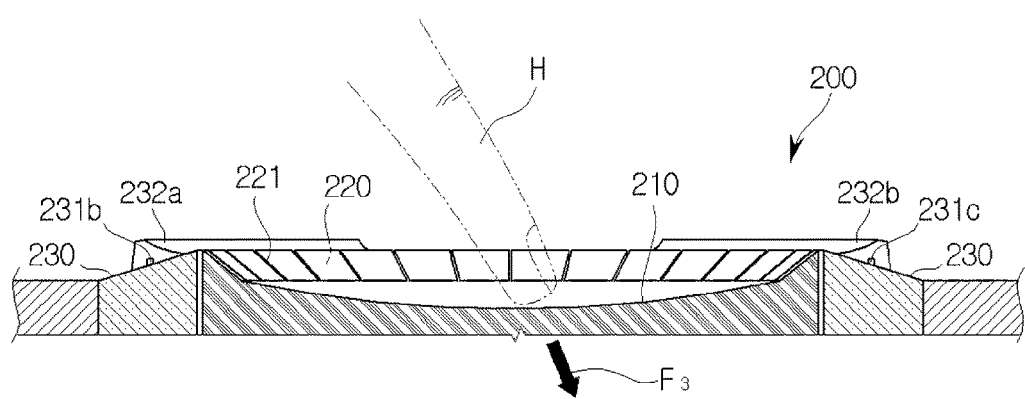

FIGS. 9A and 9B show one example how a pressure input device 600 detects the pressure from different directions, according to an embodiment of the present disclosure.

Pressure is a kind of force, which may be represented in vector form with directivity. Accordingly, the pressure input device 600 may detect not only the presence and intensity of the applied pressure but also the direction of the pressure.

In FIG. 7, the pressure input device 600 may detect the pressure F1 perpendicular to a tangent to the curved touch part. On the contrary, in FIG. 9A, the pressure input device 600 may detect a pressure F2 that is inclined to the left more than the pressure F1 is. Furthermore, in FIG. 9B, the pressure input device 600 may detect a pressure F3 that is inclined to the right more than the pressure F1.

Once the pressure input device 600 detects the direction of the applied pressure, the controller 300 may control the display 34 to move a point of view of the 3D map image to a direction corresponding to the direction of the detected pressure. For example, once the pressure F2 is detected as shown in FIG. 9A, the controller 300 may control the display 34 to move a point of view of the 3D map image to the left. On the contrary, once the pressure F3 is detected as shown in FIG. 9B, the controller 300 may control the display 34 to move a point of view of the 3D map image to the right.

In this way, the occupant may intuitively change a point of view of a 3D map image.

Furthermore, in the case of moving a point of view by controlling the display 34, the controller 300 may control the display 34 to move the point of view at a speed corresponding to the intensity of the detected pressure. In this regard, as the intensity of the detected pressure increases, the speed to move the point of view may increase.

FIG. 10 is a flowchart illustrating a method for controlling a vehicle, according to an embodiment of the present disclosure.

First, the vehicle 1 displays a 3D map image from a point of view based on map information stored in advance, in 900. More specifically, the storage 400 of the vehicle 1 may store the map information in advance, and the controller 300 of the vehicle 1 may generate the 3D map image based on the map information stored in the storage 400. The display 34 may display the generated 3D map image.

The map image stored in the storage 400 may be 3D map information including structural information of roads, objects on the road, and objects around the road. A point of view of the displayed 3D map image may be any point of view determined by a current location of the vehicle 1 or any point of view determined by selection of the occupant.

Next, the vehicle 1 checks whether pressure is detected by the input device 500, in 910. Specifically, the pressure input device 600 of the input device 500 may determine the presence of pressure applied by the occupant as well as the intensity of the pressure. If no pressure is detected, the vehicle 1 may repeatedly determine this until any pressure is detected.

However, if pressure is detected, the vehicle 1 changes the transparency of each of a plurality of objects overlapping at the same point on the 3D map image according to the intensity of the detected pressure, in 920. In this regard, the vehicle 1 may change the transparency of the overlapping objects in various methods. For example, as the intensity of the pressure increases, the vehicle 1 may increase the transparency of the objects in an order dependent upon which object or objects are nearer to the current point of view.

Accordingly, the occupant may easily check the feature of a desired one of the plurality of objects overlapping one another on the 3D map image by pressing the input device intuitively 500.

What is claimed is:

1. A vehicle comprising:
a storage configured to store map information;
a display configured to display a three-dimensional (3D) map image from a point of view based on the map information;
an input device including a pressure input device configured to detect an intensity of a pressure; and
a controller configured to increase a transparency of each of a plurality of overlapping objects, which overlap one another at a same position on the 3D map image, as the intensity of the detected pressure increases, and configured to decrease the transparency of each of the plurality of overlapping objects as the intensity of the detected pressure decreases.

2. The vehicle of claim 1,
wherein the controller is configured to
control the display, corresponding to the intensity of the detected pressure, to increase the transparency of an object among the plurality of overlapping objects, which is present within a range from the point of view.

3. The vehicle of claim 2,
wherein the controller is configured to
control the display to increase the transparency of the object according to a distance from the point of view.

4. The vehicle of claim 1,
wherein the controller is configured to
control the display, corresponding to the intensity of the detected pressure, to increase the transparency of at least one object among the plurality of overlapping objects.

5. The vehicle of claim 4,
wherein the controller is configured to
determine priorities of the plurality of overlapping objects based on an order of the plurality of overlapping objects being closer to the point of view, and
control the display to increase the transparency of a number of objects corresponding to the intensity of the detected pressure based on the priorities.

6. The vehicle of claim 1,
wherein the input device comprises
a touch input device configured to detect a touched point.

7. The vehicle of claim 6,
wherein the controller is configured to
control the display, according to the intensity of the detected pressure, to change the transparency of the plurality of overlapping objects at a point corresponding to the touched point on the 3D map image.

8. The vehicle of claim 1,
wherein the pressure input device is configured to detect a direction of the pressure.

9. The vehicle of claim 8,
wherein the controller is configured to
control the display to move the point of view to a direction corresponding to the detected direction of the pressure.

10. The vehicle of claim 9,
wherein the controller is configured to
control the display to move the point of view at a speed corresponding to the intensity of the detected pressure.

11. A method for controlling a vehicle, the method comprising:
displaying a three-dimensional (3D) map image from a point of view based on map information stored in advance;
detecting a pressure through an input device; and
changing a transparency of each of a plurality of overlapping objects, which overlap one another at a same point on the 3D map image according to the intensity of the detected pressure,
wherein the changing the transparency comprises increasing the transparency of each of the plurality of overlapping objects as the intensity of the detected pressure increases, and comprises decreasing the transparency of each of the plurality of overlapping objects as the intensity of the detected pressure decreases.

12. The method of claim 11,
wherein changing the transparency comprises
increasing the transparency, corresponding to the intensity of the detected pressure, of an object among the plurality of overlapping objects, which is present within a range from the point of view.

13. The method of claim 12,
wherein changing the transparency comprises
increasing the transparency of the object according to a distance from the point of view.

14. The method of claim 11,
wherein changing the transparency comprises
increasing the transparency corresponding to the intensity of the detected pressure of at least one object among the plurality of overlapping objects.

15. The method of claim 14,
wherein changing transparency comprises
determining priorities of the plurality of overlapping objects based on order of the plurality of overlapping objects being closer to the point of view, and increasing the transparency of a number of objects corresponding to the intensity of the detected pressure based on the priorities.

16. The method of claim 11, further comprising
detecting a touch through an input device.

17. The method of claim 16, wherein changing transparency comprises
changing the transparency, according to the intensity of the detected pressure, of the plurality of overlapping objects at a point corresponding to the touched point on the 3D map image.

18. The method of claim 11, further comprising
moving the point of view to a direction corresponding to the detected direction of the pressure.

19. The method of claim 18, wherein moving the point of view comprises
moving the point of view at a speed corresponding to the intensity of the detected pressure.

* * * * *